UNITED STATES PATENT OFFICE 2,632,115

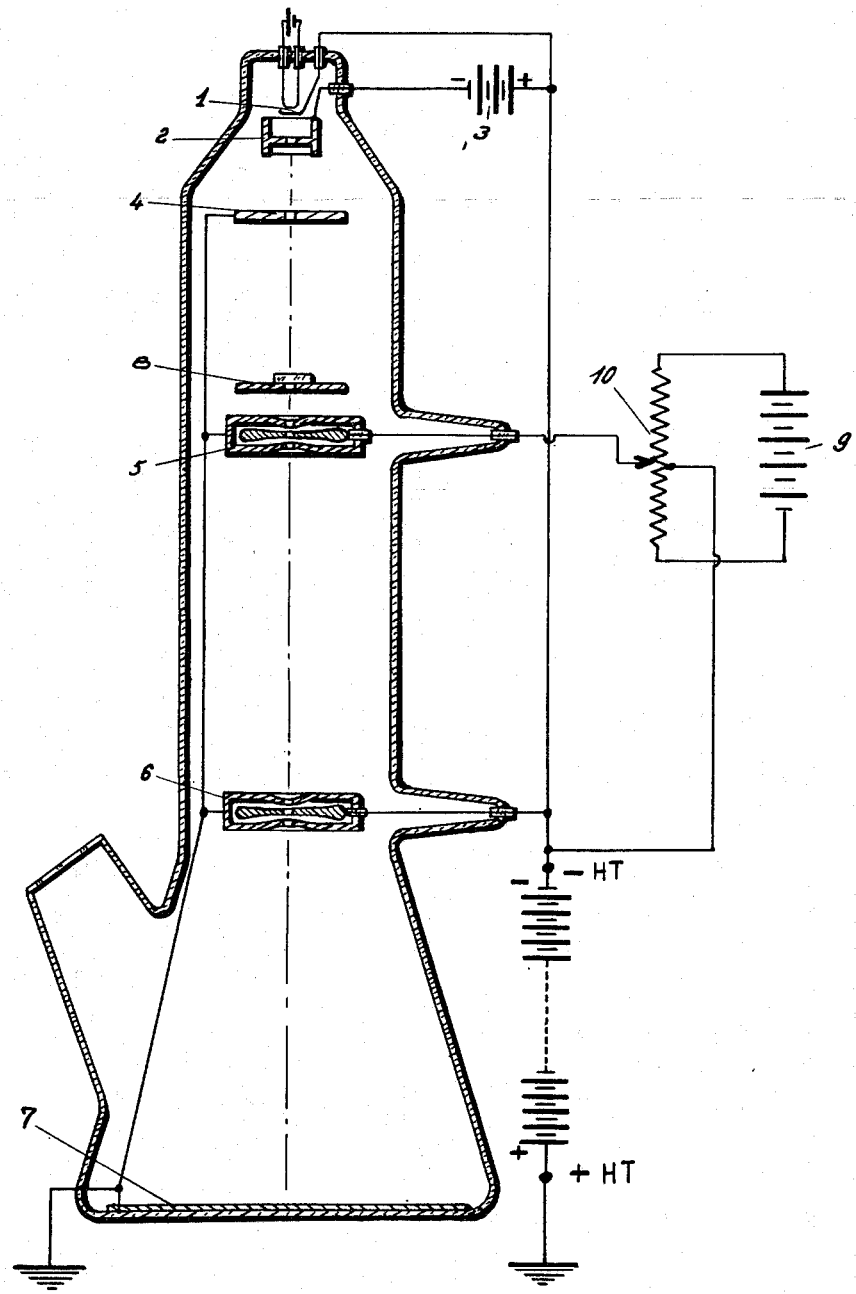

FOCUSING DEVICE FOR ELECTRON MICROSCOPES

Henri Bruck, Paris, France, assignor to Compagnie Generale de Telegraphie Sans Fil, a corporation of France Application January 13, 1948, Serial No. 2,074
In France December 10, 1946

3 Claims. (Cl. 250—49.5)

The present invention is concerned with a device for focussing the object under examination in an electron microscope wherein focussing of the electrons is effected electrostatically.

Heretofore, in such microscopes, focussing has been effected:

(a) Mechanically, by moving the object closer to or further away from the objective, the central electrode of said objective being brought to a fixed potential, namely, that of the negative pole of the high tension supply system for the microscope. However, it is often observed that, during this movement, the image to be focussed suddenly disappears sideways from the field of view. In order to avoid this effect, it would be necessary to make the direction in which the focussing movement takes place coincide, to within a few millimeters, with the optical axis and, more especially, to reduce side play in the guiding mechanism to less than one micron: these conditions are difficult to fulfill.

(b) Electrically, by arranging between the negative pole of the high tension supply to the microscope and earth, a high resistance voltage divider, enabling a variable potential to be applied to the central electrode of the objective. Adjustment of the focus of the image is then an easy matter; it is effected in a continuous manner and does not produce any unwanted lateral movement of the image. Furthermore, since the negative pole of the high tension is also connected to the filament of the microscope, any fluctuations of the high tension tend to occur simultaneously at the cathode and at the said central electrode, so that the control voltage applied to said electrode remains substantially stable, at least as regards fluctuations whose frequency is higher than the comparatively high time constant of the voltage divider.

Nevertheless, the device in question has the drawback of causing the voltage divider to consume a considerable amount of power: furthermore, it is extremely difficult to maintain with a sufficient degree of accuracy the stability of the resistances constituting the voltage divider: owing to the effects of heating, the resistance values vary with the passage of time.

It is the object of the present invention to overcome the above-mentioned drawbacks. For adjustment of the focus the device employs electrical means which may operate to perfect a rough adjustment obtained by mechanical means, each time the microscope is put into service. Alternatively, the electrical means alone may be used to carry out the entire forcussing operation: in this case an adjustable object support or stage is positioned once and for all, when the microscope is first put into use, to determine the location of the object to be examined such location lying within the limits of the range of adjustment provided by the electric focussing.

According to the invention, the usual voltage divider is eliminated and the voltage applied to the central electrode of the objective is obtained by interposing an adjustable low tension source (e. g. a potential, between 0 and 500 volts) in the connection between said electrode and the negative pole of the high tension.

It is an easy matter to construct a source of this type which supplies a very stable but, nevertheless, adjustable potential. For this purpose there may be used, for instance, a battery in which a variable number of elements can be made operative by means of a contact arm co-operating with contact studs, or a battery connected across a potentiometer; or again, a rectifier stabilized by a thermionic valve, or by a gas discharge tube, and fed from an alternating current supply system through a transformer, it being possible to adjust the voltage, either in the primary of the transformer, or at the output of the rectifier, by means of a potentiometer.

It will be seen from the foregoing statement that the invention is based upon recognition of the following facts:

(a) A comparatively small variation of the adjustable focussing potential enables a satisfactory focussing range to be obtained. For example, it has been observed that for a normal objective of 5 mm., focal length and a working high tension of 60 kv., a variation of the adjustable focussing potential between 0 and 240 volts is equivalent to a 0.1 mm. displacement of the object.

(b) Although, in the theoretical circuit arrangement of the device of this invention, the cathode and the central electrode of the objective are not supplied from the same source of potential, it is not necessary for effecting the electric focussing and for retaining the advantages thereof, to maintain in the high tension supply to the microscope a degree of stability which is greater than that obtained with the usual potential regulating devices. Thus, in the case of the foregoing numerical example, assuming the chromatic aberration constant of the objective to be equal to 25 mm., and for an angle of illumination of $10^{-3}$ radian, the maximum relative values permissible for fluctuations of the high tension, and also of the auxiliary focussing potential are of the order of 5%; this being a degree of stability which can readily be obtained in the normal supply systems.

The accompanying drawing schematically shows, by way of a non-limitative example, a circuit diagram of the device of the invention.

The electron microscope comprises, inside a vacuum chamber: an electron gun constituted by an emissive filament 1, a Wehnelt cylinder 2 negatively biassed by means of a source of biassing potential 3 and an accelerating anode 4: electrostatic lenses 5 and 6, each formed of three equi-distant perforated discs, the first lens acting as an objective and the second as a projection lens and a screen 7, receiving the final image: the object is placed on the object support or stage 8. The external discs of each lens are raised to the acceleration potential of the electrons, i. e. to the potential of the positive pole + H. T. of the high tension, which latter may be obtained, for example, from an alternating current supply system and a transformer: as to the central discs, these are connected to the filament and consequently to the negative pole — H. T. of the high tension. The central disc of the lens 6 is connected directly to — H. T. whereas the central disc of the lens 5 is connected through the adjustable voltage source which is the subject of the present invention and which comprises the system formed by the constant voltage source 9 and the potentiometer 10 connected across the terminals of said source 9.

I claim:

1. An electronic system comprising an electronic microscope which includes an electron emitting cathode, a Wehnelt cylinder, an accelerating anode, objective and projection lenses, each formed by three centrally apertured electrodes consisting of two external electrodes and a central electrode located therebetween, a screen, a high voltage source, the positive pole of which is connected to said screen and to said external electrodes and with said anode, and the negative pole of which is connected with said cathode, a supplementary voltage source, a potentiometer connected in shunt with said supplementary source, an adjustable tap on said potentiometer, the central point of said potentiometer being connected with the negative pole of said high voltage source and said adjustable tap being connected to the central electrode of said objective lens.

2. An electrostatic electronic sytem comprising a microscope of electrostatic type including an electron emitting cathode, an accelerating anode, negatively polarized electrostatic lenses each formed of a central disk and two external electrodes and a screen receiving the final image, a high voltage source, the negative pole of which is connected to said cathode and the positive pole of which is connected to said screen, said anode and to the external electrodes of the lenses, the first of said lenses operating as an objective lens and the second as a projection lens, a supplementary voltage source, a potentiometer connected in shunt with said supplementary source, an adjustable tap on said potentiometer, the central point of said potentiometer being connected with the negative pole of said high voltage source, the said adjustable tap being connected with the central disk of said objective lens, and the central disk of the projection lens being supplied with a potential derived from the negative side of said high voltage source.

3. An electronic system comprising an electronic microscope including an electron emitting cathode, a negatively polarized Wehnelt cylinder, an accelerating anode, means for supporting an object, two electrostatic lenses, each formed of three centrally apertured electrodes consisting of two exterior electrodes and a central electrode located therebetween, a screen for receiving the final image, a high voltage source, the positive pole of said source being connected with said screen and to said anode and to said exterior electrodes, whereby said lenses operate, the first as an objective lens and the second as a projection lens, supplementary adjustable voltage supply means connected with the high potential source at its negative pole, and means connecting the central electrode of the said objective lens, with a regulatable point of the said adjustable voltage supply means.

HENRI BRUCK.

REFERENCES CITED

The following references are of record in the file of this patent:

UNITED STATES PATENTS

| Number | Name | Date |
|---|---|---|
| 2,160,021 | Iams | May 30, 1939 |
| 2,161,316 | Rogowski et al. | June 6, 1939 |
| 2,189,319 | Norton | Feb. 6, 1940 |
| 2,225,479 | Jonker et al. | Dec. 17, 1940 |
| 2,229,766 | Nicoll et al. | Jan. 28, 1941 |
| 2,290,377 | Nolinari | July 21, 1942 |
| 2,292,087 | Ramo | Aug. 4, 1942 |
| 2,293,151 | Linder | Aug. 18, 1942 |
| 2,358,902 | Ziebolz | Sept. 26, 1944 |
| 2,396,624 | Von Borries | Mar. 12, 1946 |
| 2,424,791 | Backman et al. | July 29, 1947 |